No. 807,432. PATENTED DEC. 19, 1905.
M. BLAKEY.
SKELP FOR MAKING TUBES.
APPLICATION FILED JAN. 4, 1905.

2 SHEETS—SHEET 1.

WITNESSES:
J. P. Appleman
Elva Stanick

INVENTOR
Mildred Blakey
by Pierce & Barber
his ATTORNEYS

No. 807,432. PATENTED DEC. 19, 1905.
M. BLAKEY.
SKELP FOR MAKING TUBES.
APPLICATION FILED JAN. 4, 1905.
2 SHEETS—SHEET 2.
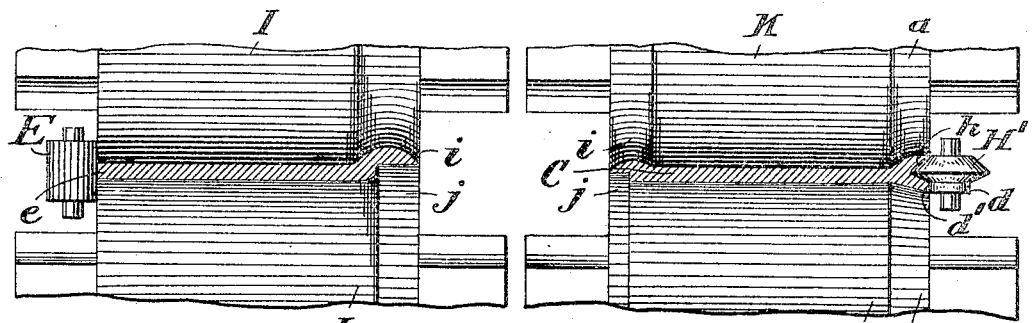
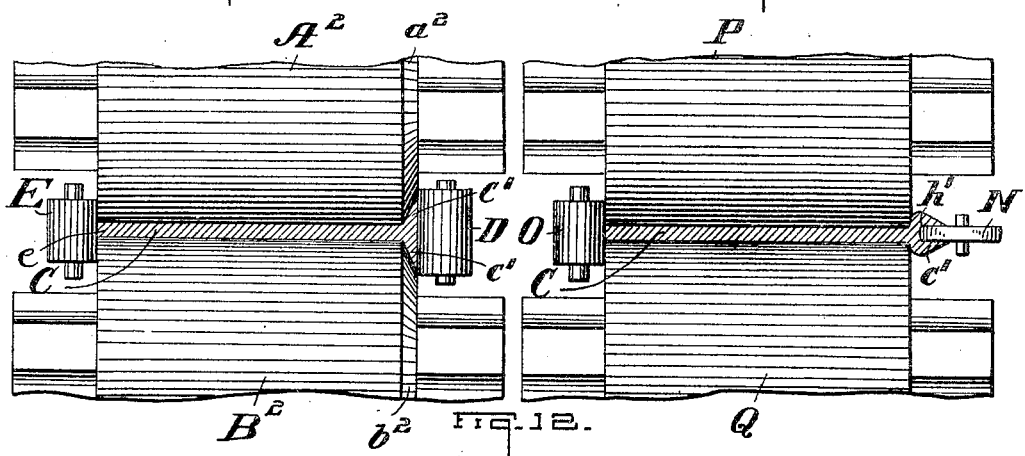
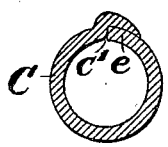
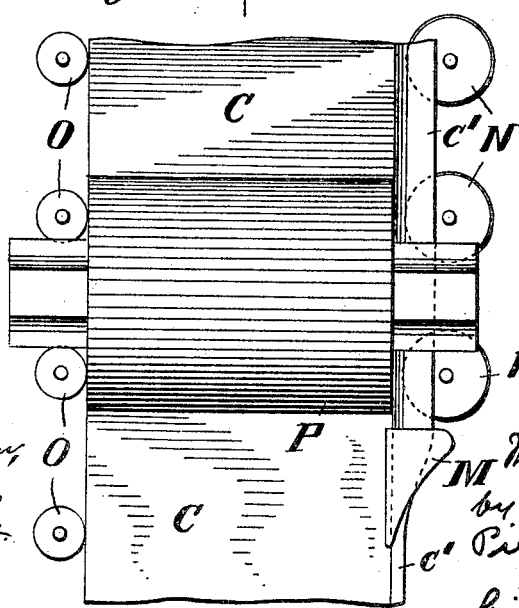
WITNESSES:
INVENTOR
Mildred Blakey
by Pierce & Barber
his ATTORNEYS

UNITED STATES PATENT OFFICE.

MILDRED BLAKEY, OF PITTSBURG, PENNSYLVANIA.

SKELP FOR MAKING TUBES.

No. 807,432.  Specification of Letters Patent.  Patented Dec. 19, 1905.

Application filed January 4, 1905. Serial No. 239,598.

*To all whom it may concern:*

Be it known that I, MILDRED BLAKEY, a citizen of the United States, residing at Pittsburg, in the county of Allegheny and State of Pennsylvania, have invented or discovered new and useful Improvements in Skelps for Making Tubes, of which the following is a specification.

My invention relates to blanks or skelps for making welded tubes.

The object of my invention is to produce skelps which will form tubes having the features of both butt-weld and lap-weld tubes.

Figure 1:
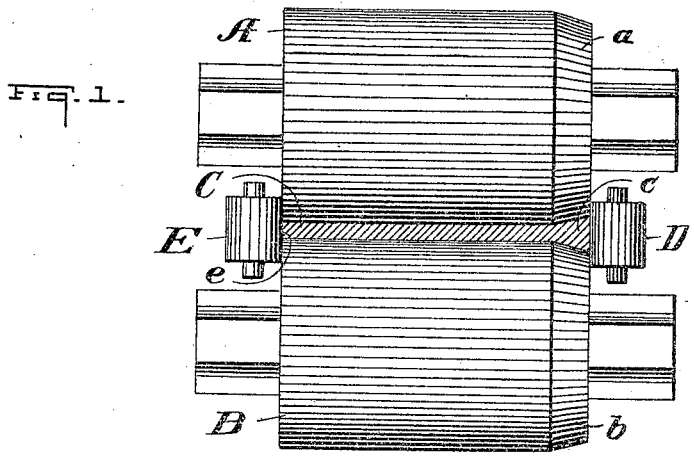
Figure 2:
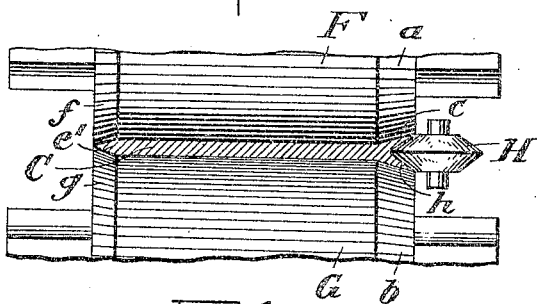
Figure 3:
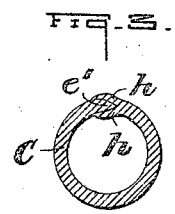
Figures 4, 5:
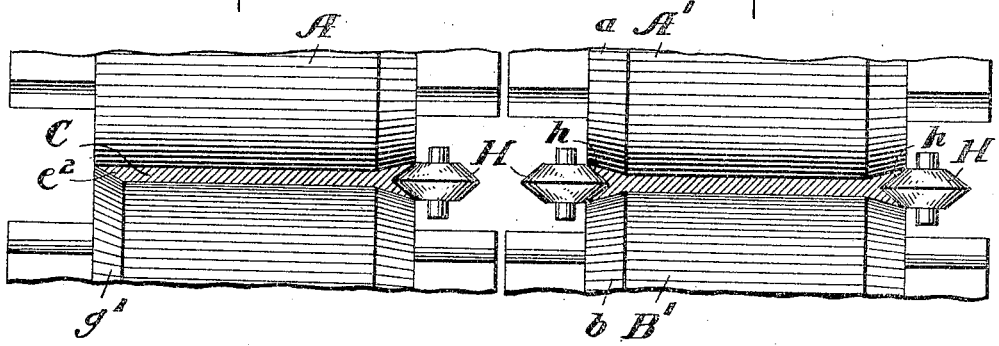
Figure 6:
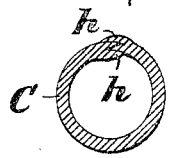

Referring to the drawings which form a part of this specification, Figure 1 shows one step in the manufacture of one form of my invention; Fig. 2, another step in the manufacture thereof; Fig. 3, a section of this form of my invention bent into tubular shape; Fig. 4, the second step of Fig. 2, modified to produce a second form of my invention; Fig. 5, a modification of said second step to produce the third form of my invention; Fig. 6, a section of this last form bent into tubular shape; Fig. 7, a method producing the fourth form of my invention; Fig. 8, a section of the skelp C shown in Fig. 7, with its ends assembled; Fig. 9, a modification of Fig. 2 to produce the fifth form of my invention; Figs. 10 and 11, views of successive steps by which the sixth form of my invention may be produced, and Fig. 12 a plan showing one method of bending down the flanges of the skelp shown on Fig. 10.

In Fig. 1, A and B are a pair of horizontal rolls, having adjacent ends of each beveled at $a$ and $b$, as shown, whereby the plate or skelp C, rolled therebetween, may have a thickened or upset edge $c$. I have shown the small vertical roll D set between the necks of the rolls A and B and bearing against the ends of the rolls and the edge $c$ of the skelp to confine the metal and give it a square edge for the second step; but this roll may be omitted or modified or an equivalent may be used, if preferred. The small vertical roll E may bear against the other edge of the sheet, if preferred, to give this edge $e$ the desired shape; but it may be omitted. The edge $e$ may be rounded, if desired, by shaping the rolls similar to the bevels $a$. The skelp C may next be passed between the rolls F and G, having the tapered or beveled portions $a$ and $b$ at one end and the enlarged inclined portions $f$ and $g$ at the other end. The portions $a$ and $b$ diverge toward the adjacent end of the rolls to receive the upset edge $c$ of the skelp C and form die-surfaces for shaping it as it is wedged thereagainst by the beveled roll H, which forms a V-shaped groove $h$ along the said upset edge of the skelp. The inclined surfaces $f$ and $g$ converge toward the adjacent ends of the rolls and form therebetween the tapered or wedge-shaped edge $e$ of the skelp.

The skelp produced by the rolls is heated and welded in any suitable furnace and welding apparatus in a manner easily understood by those acquainted with the art of forming welded tubes, particularly lap-weld tubes.

In Fig. 4 the edge $e^2$ has only one side tapered instead of both, as in Fig. 2, one of the rolls, as A, having the same shape as in Fig. 1 and the other as in Fig. 2.

In Figs. 5 the rolls A′ and B′ are like A and B of Fig. 1, except that both ends have the beveled portions $a$ and $b$, by which skelps having both edges upset may be provided with wedge-shaped grooves $h$, made by the rolls H at each end of the rolls. Fig. 6 shows a tubular skelp with the V-shaped edges assembled.

In Fig. 7 the roll I has at one end the annular groove $i$ to give one edge of the skelp C an offset bent up approximately the thickness of the skelp and with the surface formed by the groove $i$ convex, tapered, or thinned, as shown. The roll J has the rib $j$ to press the edge of the skelp into the die-groove $i$. The edge $e$ of the skelp is bent so as to lie beneath the offset and against the shoulder $c'$, as shown in Fig. 8.

In Fig. 9 one edge of the skelp C is formed with an offset by the rolls K and L, having at one end the groove $i$ and the rib $j$ and at the other end the beveled portions $a$ and $b$. The roll H′ is similar to roll H of Fig. 2, but has the shouldered portion $d$ to give one of the sides of the V-shaped groove $h$ the square edge $d'$.

In Fig. 10 the rolls A² and B² have the beveled portions $a^2$ and $b^2$, which are much like the portions $a$ and $b$ of the rolls A and B of Fig. 1, except that the portions $a^2$ and $b^2$ do not extend so far toward the centers of the rolls and farther toward their necks. The apparatus of Fig. 10 forms decided flanges $c'$, the roll D being used to make the flanged edge of the skelp at a right angle to its body. The skelp C then passes with its flanged edge through the die M, which turns them down to form the channel $h'$. One or more horizontal rollers N travel in this groove to prevent the skelp from being pulled sidewise by the die M, and the rollers O may be used against the other edge of the skelp, as preferred. The skelp is assisted, if desired, through the die M by the rolls P and Q, which are plain rolls.

While I have described the method by which the various illustrated skelps may be formed, they may be otherwise formed, as the apparatus forms no part of the present invention. I do not limit myself to the forms of skelps shown, as other forms or modifications can be devised which come within the spirit of my invention.

Having described my invention, I claim—

1. A tube-skelp having material at one edge offset in opposite directions from the plane of the body of the skelp to receive material at the opposite side thereof.

2. A tube-skelp having one edge thicker than the body of the skelp and provided with a groove.

Signed at Pittsburg, Pennsylvania, this 27th day of December, 1904.

MILDRED BLAKEY.

Witnesses:
W. L. HOLDING,
EDWARD SHANNON.